Feb. 18, 1947.  E. B. SCHERL  2,415,912
METHOD AND APPARATUS FOR PRESSURE WELDING METAL MEMBERS
Filed Oct. 29, 1943
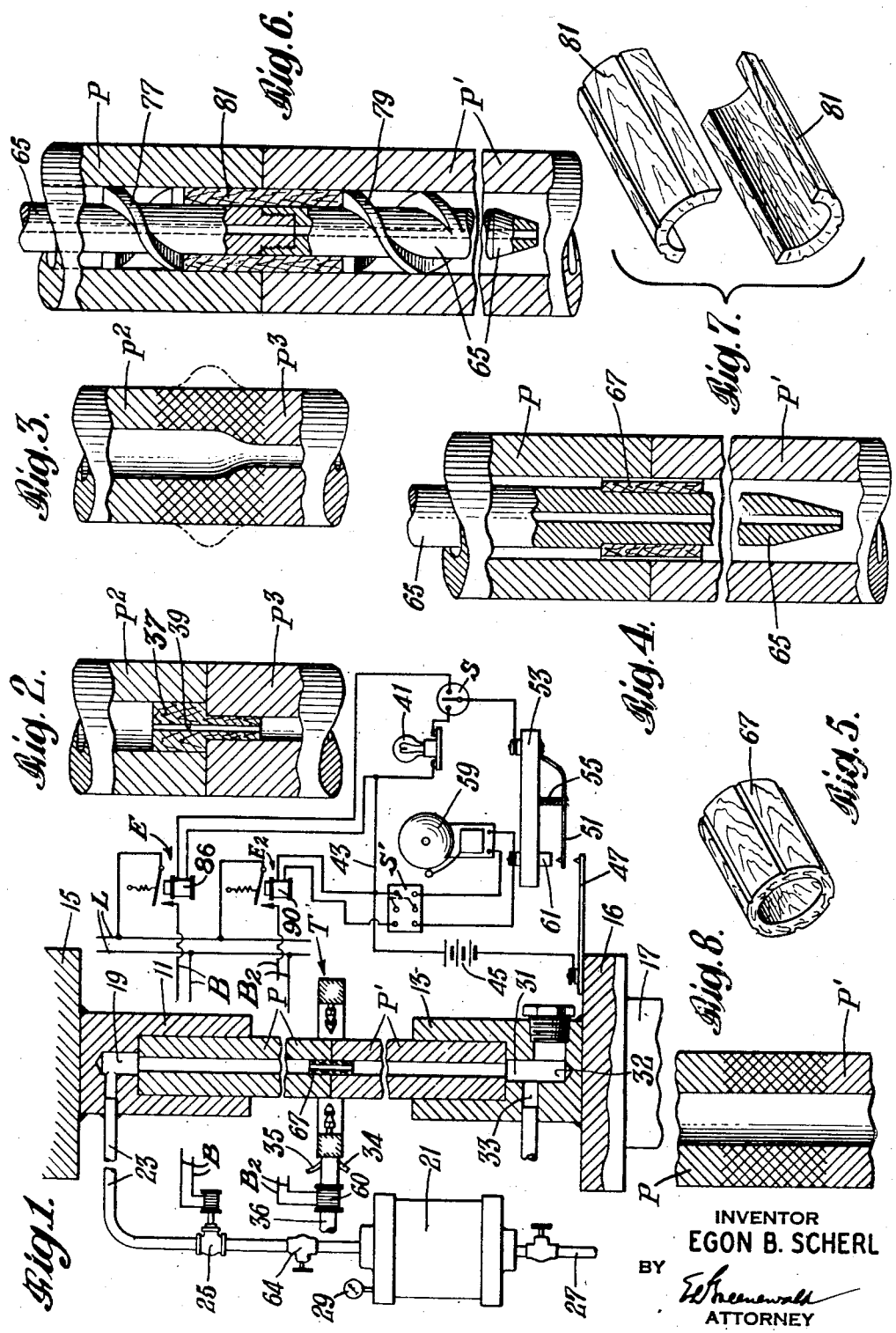
INVENTOR
EGON B. SCHERL
BY
ATTORNEY Patented Feb. 18, 1947

2,415,912

UNITED STATES PATENT OFFICE 2,415,912

METHOD AND APPARATUS FOR PRESSURE WELDING METAL MEMBERS

Egon B. Scherl, Niagara Falls, N. Y., assignor to The Linde Air Products Company, a corporation of Ohio Application October 29, 1943, Serial No. 508,168

11 Claims. (Cl. 78—84)

This invention relates to the pressure welding of tubular members; and more especially it concerns a process and apparatus for the pressure welding of tubular or hollow members of weldable metal wherein the ring or ridge of upset metal ordinarily present within the members at the welded joint following a pressure welding operation has been eliminated during that operation, and the abutting ends of the members are maintained in proper alignment throughout the welding operation. The invention has especial utility for the pressure butt-welding of tubular members of weldable material, conducted at temperatures below the liquidus temperature of the metal, and preferably not substantially above the solidus temperature. It also has special merit for the pressure welding of tubular members of relatively small internal diameter, such as rock drill rod; and for the butt-welding of tubular members having different internal diameters and/or different wall thicknesses.

Among the more important objects of the invention are: to provide a novel process and apparatus for aligning tubular metal members to be butt-welded prior to a pressure welding operation, and for maintaining such alignment until the welded joint has been completed; to provide a novel process and apparatus for removing the internally upset metal present at a pressure-welded joint formed from tubular members; to provide for so conducting the pressure butt-welding of tubular members that there will be no sudden change in cross-sectional area in the internal bore of the tubular member at the joint, even though the internal diameters of the members to be welded differ materially from each other. These and other objects will be evident from the following description of the invention.

In the practice of the invention, according to one preferred embodiment thereof, the central passages of two tubular members of weldable metal are aligned by inserting a shaped member of combustible material such as wood, pressed board, pressed paper, various cokes such as petroleum coke, or the equivalent, within the passage in one end of one of the members to be welded, after which an opposite end of said combustible member is inserted into an end of the second member to be welded. The combustible member preferably lies coaxially within the two members and snugly fits each thereof, with the margins of the two members to be welded in abutting relation. Preferably the combustible member has a plurality of longitudinal passages extending therethrough, or has grooves in the outer periphery, to permit free gas flow from one tubular member to the other.

After the combustible member is suitably positioned, with the inner surfaces of the tubular members in alignment, the latter may be adjusted, where necessary, by rotating one or both members about the combustible member. The tubular members are then forced together under a selected pressure which may conveniently range between 1,000 and 5,000 lbs. per sq. in. and, during such application of pressure, are welded in well-known manner by the application of welding heat thereto at and adjacent the abutting surfaces. While electric welding procedures such as flash-, resistance-, and high frequency induction welding may be employed, the best results are secured by the use of flames produced by the combustion of oxy-fuel gas mixtures and discharged from an annular torch head surrounding the tubular members at and adjacent the abutting ends, such as the sectional annular torch head disclosed in the pending application, Serial No. 350,680 of A. R. Lytle and W. Morton, filed August 3, 1940. Preferably the welding head is reciprocated across the abutting ends, and the flames are so directed with respect to the tubular members, that the metal at and adjacent the interface formed by the abutting ends is raised to a welding temperature below the liquidus temperature of the metal and at least as high as the solidus temperature thereof.

As the welding temperature is reached, upset metal moves laterally at and adjacent the abutting ends and forms both external and internal ridges around the girth of the pipes. The combustible member meanwhile is carbonized and is in part consumed by the heat transmitted thereto through the highly-heated members at the joint in the presence of air.

When the welding operation is almost completed, as indicated by a selected shortening of the members, a predetermined quantity of a metal-oxidizing or metal-combusting gas such as oxygen is flowed, preferably at a preselected rate, through the central passage within one of the tubular members, and thence is directed upon and across the zone of incandescent upset metal at the interior surface of the members forming the joint, while such metal is at its kindling temperature. Thus the ridge of upset metal is progressively combusted while, concurrently, combustion of the combustible aligning member is completed. The resultant combustion gases flow through the other tubular member and are then withdrawn.

Surprisingly, the combustion of the upset metal and the combustible member at the welding zone does not produce a temperature sufficiently high to injure the adjacent metal or to melt the same. The temperature produced is not significantly different from that existing under ordinary torch-cutting conditions. The zone of combustion is limited entirely to that portion of the metal which is at the kindling temperature. This is substantially the upset metal.

The channels and/or pores in the combustible member permit free passage of the metal-combusting gas, even in the event of collapse of the member during some stage of the pressure welding operation. Early release of volatile constituents still further increases the porosity of the combustible member.

After completion of the welding and the upset metal-removing operations, as evidenced by a preselected shortening of the members at the joint, the pressure is released and the welded joint is permitted to cool; or the latter may be subjected to any suitable heat-treating operation, such as those respectively disclosed in the Renner Patent No. 2,231,027 and in the Lytle et al. Patent No. 2,231,014.

It often is advantageous, in order to facilitate the insertion of a snugly fitting combustible aligning member within the tubular members to be welded, to coat the combustible member with a combustible composition adapted to have a protective action on the member for preventing shredding or splintering thereof during positioning of said member. Thus the member may have a coating of shellac or other combustible natural or artificial resin composition which provides a hard surface, but which coating is consumed upon completion of the welding operation.

Longitudinal grooves may be formed in the outer surface of the combustible member, or the latter may have longitudinal passages extending therethrough near the outer surface, to facilitate the flow of oxgen or other metal-combusting gas past the upset metal within the tubular members during the later stages of the welding operation, and to facilitate the elimination from the interior of the joint of the gaseous products of combustion. Such grooves or passages also insure against plugging of the central passage in the welded joint which might result when tubular members having small internal passages are upset internally during a pressure welding operation. Throughout the welding step the combustible member continues to permit the flow of gases past the joint regardless of whether the member has collapsed as a result of the pressure of the internally upset metal at the joint.

In the accompanying drawing, wherein is illustrated certain preferred embodiments of the invention, Fig. 1 is a diagrammatic view of apparatus adapted for the practice of the process of the invention, parts being broken away, and parts being shown in section;

Fig. 2 is a fragmentary sectional view of two abutting tubular members of different internal diameters, with an aligning member therein;

Fig. 3 is a view similar to Fig. 2, showing the members of Fig. 2 following the completion of a pressure-welding operation and the removal of upset metal;

Fig. 4 is a fragmentary sectional view of two abutting tubular members, and an annular form of combustible aligning member with associated cooling means, prior to a welding operation, parts being broken away;

Fig 5 is a perspective view of the combustible member of Fig. 4;

Fig. 6 is a view similar to Fig. 4, showing a sectional annular aligning member, and another form of associated cooling means;

Fig. 7 is a perspective view of the sectional aligning member of Fig. 6; and

Fig. 8 is a longitudinal section through a welded joint uniting two tubular members, made in accordance with the invention.

Referring now to the drawing, two tubular members or pipes P, P' are suitably secured, as by lock bolts (not shown), within recesses in the respective aligned members 11, 13. The latter are secured, respectively, to a fixed supporting member 15, and to a bed plate 16 mounted on the piston 17 of a hydraulic jack or the equivalent (not shown). The recess in member 11 is provided with a counterbore or well 19 of reduced diameter. The latter is in communication with a container 21 for a metal-combusting gas such as oxygen, ozone, air, oxygenated air or the like through a conduit 23 having therein a quick-acting cutoff valve 25. The container 21 is provided with a valve-controlled gas inlet line 27, and with a pressure gauge 29. The pipe supporting member 13 likewise has a counterbore or well 31 of smaller diameter than the recess accommodating the member P', thereby providing a shoulder upon which the tubular member P' rests. The recess 31 is in permanent communication through passage 33 with the atmosphere, or with a suitable point of discharge for combustion gases and oxides. A slag well 32 formed in member 13 and closed by a threaded plug permits removal of metal oxides and prevents plugging of gas conduit 33.

For directing welding heat upon the outer margins of the tubular members at and adjacent the abutting margins, there may be provided, as shown, an annular torch head T having a plurality of radially-disposed or inwardly-directed welding gas tips adapted to discharge a substantially continuous welding flame upon the abutting margins of the members being welded. The welding head may be made in two semi-annular sections, each supplied with cooling water through an inlet 34 and an outlet 35 in well-known manner, and with a combustible gas mixture through a conduit 36.

For initiating combustion of the internally upset metal and of the aligning member upon a predetermined shortening of the tubular members being welded, there may be provided a signal device such as an electric lamp 41 disposed in an electric circuit 43 having a source of electric power 45, a contact member 47 secured to the bedplate 16, and a resilient contact member 51 carried by an insulated supporting member 53 and adjustable by means of an adjusting screw 55. The arrangement of parts is such that, during a welding operation, upon a selected shortening of the members P, P' being welded, member 47 contacts member 51, and lamp 41 is illuminated. The operator then throws valve 25. This initiates flow of metal-combusting gas from the container 21 to and past the internal ridge of highly heated upset metal at the welded joint, thus progressively consuming such upset metal and the combustible aligning member present within the members. The lamp may be replaced by a relay which, when energized, opens a solenoid-controlled cutoff valve 25.

The capacity of the container and the pressure of the oxygen or the like therein is so selected that it is sufficient to combust both the highly heated internally upset metal at the joint and the combustible member during the period of its flow. A regulating valve 64 in line 23 permits regulation of the rate at which oxygen is fed from the container 21 to the welding zone within the members being joined.

For discontinuing the welding heat upon a slight additional shortening of the highly heated members at the joint, a signal bell 59 is disposed in an electric circuit which includes a source of electric power 45, and contacts 47, 51 and 61. During the latter part of a welding operation member 47 forces member 51 to contact member 61, thereby causing the bell 59 to ring, whereupon the operator discontinues the welding heat. If desired, there may be substituted in circuit 43 for the bell 59 a relay operating a solenoid 60 controlling the cutoff valve in the conduit 36 conducting welding gas to the welding head T for cutting off the flow of gas to the latter upon a preselected shortening of the tubular members.

Although in the form of the invention shown in Fig. 1, a reservoir or container for oxygen is provided, it will be understood that the oxygen may be flowed directly to the interior of the tubular members through recess 19 from a source of supply under a selected constant pressure for a measured interval of time. The procedure using a reservoir has been found to provide a suitably accurate control at all times over the amount and velocity of the gas admitted to the internal welding zone without the use of any timing mechanism.

Figs. 2 and 3 illustrate the application of the invention to tubular members having different internal diameters. In pressure welds that have been made in members of different internal diameter by previously known methods, the internal diameter of the member of smaller bore is often seriously reduced at and adjacent the interface between the abutting ends. As a result, a shelf of metal is formed at the interface where there is a very abrupt increase in internal diameter in the member of larger internal diameter. As shown in Fig. 3, by the practice of the present invention, the change in internal diameter of the members at the welded joint is gradual, and the abrupt shelf structure is eliminated. The dotted lines in Fig. 3 represent the outer ridge of upset metal prior to its removal by cutting, grinding or the like. When welding members of unequal internal diameter, it is preferred that the metal-combusting gas be directed to flow from the member of larger internal diameter to the member of smaller internal diameter.

In the form of the invention illustrated in Figs. 2 and 3, a combustible aligning member 37 is employed having its respective ends of different sizes in order to accommodate tubular members P², P³ of different internal diameters. The member 37 has a longitudinal passage or passages 39 therethrough.

In cases where tubular members of relatively large internal diameters are to be welded, a considerable quantity of the metal-combusting gas might ordinarily fail to come in contact with the highly heated surface of the upset metal and therefore be wasted. For preventing such loss of this gas, there is provided within the members being welded, in the form of the invention illustrated in Figs. 4 and 6, a centrally-disposed fluid-cooled conduit 65 having an inlet end extending through one of the tubular members to be welded and thence through a passage (not shown) in supporting member 15 to a source of water or other cooling fluid under pressure. The discharge end of member 65 extends beyond the internal welding zone, whereby the cooling fluid is quickly removed from the welding zone without contacting the metal or combustible member in that zone. In the form shown in Fig. 4, the portion of member 65 adjacent the welding zone is of reduced outer diameter and permits the slipping into place, upon the surface and into contact with the respective tubular members at and adjacent the abutting ends, of a longitudinally grooved combustible member 67 such as shown in Fig. 5. During the welding operation the metal-combusting gas flows through and around the grooves in member 67 and into close proximity with the ridge of upset metal.

Fig. 6 illustrates another modification of the invention suitable for use in the butt welding of oil-well drill pipe and the like. The central cooling fluid conduit 65 may be of unitary construction; and it may be provided with short helical aligning members 77, 79, disposed at spaced points on opposite sides of the welding zone and having surfaces adapted to contact the internal surface of the tubular members being butt-welded at spaced points remote from and on each side of the welding zone. A longitudinally-sectioned tubular combustible member 81 having longitudinal grooves or serrations in its outer surface surrounds the member 65 at and adjacent the abutting margins of the member P'. It will be evident that by this arrangement, the cooling core or member 65 cannot sag and undesirably cool the inner walls of either tubular member in the event of the collapse of the combustible member. This arrangement is especially advantageous when welding horizontally-disposed work pieces where the distance from the welded joint to the open end of the cooling member is relatively long.

The conduit 65 preferably is formed of two sections joined together by threaded end portions in well known manner, as illustrated. In use the interconnected end portions may be disposed adjacent the abutting ends of the members being welded, and may be disconnected and separately removed after the welding operation. When using this two-piece construction, the combustible member 81 may be in one piece.

It will be noted that the spiral guides 77, 79 support the cooling member 65 in its central position. The guides may be reciprocated across the welded joint to provide a cutting or scraping action for removing any slag or scale present on the internal walls of the pipe. The principal function of the cooling member is to assist in directing the metal-combusting gas upon the ridge of upset metal. The cooling medium passing therethrough simply prevents injury to the member 65 during the metal-combusting operation. The spiral guides thus provide proper alignment of the members and ready passage of the metal-combusting gas; and they insure the removal of scale or slag from the welded joint, where necessary.

Fig. 8 is a longitudinal section taken through two abutting tubular members P, P' across a welded joint made in accordance with this invention, following removal of externally upset metal from the outer surfaces of the members at the joint by a machining operation. It illustrates the effectiveness of this invention for eliminating upset metal formed within tubular members during a pressure welding operation.

The following will describe one form of operation of the apparatus for the welding of rock drill pipe:

By means of the combustible member 67 the two tubular members P, P' to be welded are properly aligned in the welding apparatus of Fig. 1. The signal mechanism is adjusted so that the distance between the contact 47 and the contact point 61 minus the thickness of the contact arm 51 equals the desired amount of shortening of the members. This amount is previously determined for each welding operation. The distance between contacts 51 and 61 is then set by means of the adjusting screw 55 at about $\frac{1}{16}$ of an inch. This represents the point in the upsetting operation at which flow of the metal-combusting gas to the welding zone is begun. With the quick-acting valve 25 closed, a metal-combusting gas such as oxygen is admitted to container 21 through line 27 until the container is under a preselected oxygen pressure, after which the valve in line 27 is closed.

Welding pressure is applied through the hydraulic jack and associated parts 17, thereby forcing the abutting margins of the members P, P" together under pressures which preferably are within the range from 1,000 to 2,000 lbs. per sq. in. The torch head T is then placed in position with the torch tips directed to discharge welding flames around the outer periphery of the members P, P' at and adjacent the interface formed by the abutting ends. An oxy-fuel gas mixture flowing from the torch tips is ignited, and the metal at the abutting ends of the members P, P' is quickly brought to a welding temperature below the liquidus temperature of the metal.

During the welding operation the annular torch head is reciprocated across the interface between the members to facilitate the even distribution of heat at the welding zone. As the heating proceeds, the combustible member 67 is carbonized, and the metal at the abutting ends of the members is softened and upset laterally to form both internal and external ridges of upset metal.

As the tubular members are progressively shortened, the advancing jack head 17 causes contact between members 47 and 51, lighting the lamp 41, whereupon the valve 25 is opened, and oxygen is discharged through conduit 23 and member P, and the passages or grooves in and around the combustible member 67 to the internal ridge of upset metal, thereby progressively consuming such upset metal and the combustible member. The combustion gases leave through member P' and conduit 33. As the jack head 17 continues its advance, the member 47 engages contact 61 through member 51, whereupon bell 59 rings, and the flow of combustible gas mixture to the torch head T is discontinued by the operator. Prior to the welding operation the gap between the members 51 and 61 is so arranged that the container 21 will have discharged all of the gas slightly prior to the end of the welding operation, thereby avoiding the occurrence of even minor concavities within the tubular members at the welded joint which might otherwise be produced by undercutting of the internally upset metal.

When it is desired to utilize automatic means for initiating the flow of the metal-combusting gas upon a selected shortening of the tubular members, a relay (see Fig. 1), which includes an electromagnet E having a winding 86 may be disposed in the circuit having the power source 45. When energized the electromagnet E moves a pivoted contact member against the action of a spring to close a branch circuit B leading from a line circuit L, thereby energizing the electromagnetic valve 25 and opening the latter. A switch S permits control of the current so as selectively to direct it through the lamp 41 or through the winding of electromagnet E.

Likewise, when it is desired to utilize automatic means for discontinuing the flow of welding heat upon a selected shortening of the members, a relay, which includes an electromagnet $E^2$ having a winding 90, may be disposed in the circuit having power source 45. When energized electromagnet $E^2$ moves a contact member against the action of a spring member to close a branch circuit $B^2$ leading from line circuit L, thereby energizing the electromagnetic valve 60 and closing the latter. A switch $S^2$ permits the electric current to be directed selectively through the bell 59 or through the winding 90 of electromagnet $E^2$.

In the practice of the invention for the pressure welding of tubular members made of medium carbon steel, each having an outer diameter of 1.25 inches and an inner passage 0.313 inch in diameter, using apparatus of the type described herein, the ends of two of these tubular members were aligned by means of a wooden member of the type shown in Fig. 1. They were then forced together under a pressure of around 3,800 lbs. per sq. in. and were brought to a welding temperature of around 1230° C. by welding flames directed in the manner described. After the members had, during the welding operation, been shortened 0.563 inch, oxygen was directed upon the combustible member and the ridge of upset metal within the members from an oxygen container having a capacity of 1360 cc. and which initially was under an oxygen pressure of 12 lbs. per sq. in. The resultant welded joint was free from the internal constriction such as is normally present in pressure welded pipe joints due to upset metal; and the internal passage at the welded joint was substantially the same diameter as the passage within the members at points remote from the joint.

Following the welding operation, the welded joint may be heat-treated in well-known manner, such as that described in Patent No. 2,231,014 of A. R. Lytle et al. or by other well-known processes, preferably employing temperatures within the range between 850° C. and 900° C. This heat treatment may be given the welded joint before its removal from the welding apparatus, after release of the welding pressure; or the welded joint may be heat-treated by a subsequent operation.

It will be understood that the amount of metal-combusting gas required for a welding operation will vary depending upon such factors as the composition of the tubular members being welded; the size and metal thickness of such members; the amount of shortening of the members during the welding operation required to provide a satisfactory joint; and the nature of the metal-combusting gas employed.

The invention is susceptible of modification within the scope of the appended claims.

I claim:

1. Process for welding hollow members of weldable metal, which comprises placing two of such hollow members with a margin of each in abutting relation under a selected pressure with an aligning member of combustible material extending within the passage in the abutting portions of such members, heating the members at and adjacent the abutting surfaces to a temperature substantially below the liquids temperature of the metal, thereby forcing upset metal inwardly within said members at and adjacent the interface formed by the abutting ends, thereafter, while maintaining such pressure, flowing a selected volume of a metal-combusting gas into contact with said upset metal and with said aligning member while such upset metal and aligning member are at their kindling temperatures, thereby consuming the same, and discontinuing the flow of such gas when a selected portion of the upset metal has been consumed.

2. Process for welding hollow members of weldable metal which comprises placing two of such hollow members with a margin of each in abutting relation under a selected pressure with a gas-pervious aligning element of combustible material fitting within the abutting portions of such members, heating the members at and adjacent the abutting surfaces to a temperature substantially below the liquidus temperature of the metal, thereby forcing upset metal inwardly within said members at and adjacent the interface formed by the abutting ends, thereafter flowing a selected volume of a metal-combusting gas into contact with said upset metal and with said aligning member while such upset metal and aligning member are at their kindling temperatures, thereby consuming each thereof, and discontinuing the flow of such gas when a selected portion of the upset metal has been consumed.

3. In the process of pressure butt-welding tubular members of weldable metal, the steps of applying welding heat to the outer margins of the members at and adjacent the abutting margins of said members while such members are forced together under high pressure and while a gas conducting aligning member of combustible material has end portions snugly fitting within the respective members at and adjacent the abutting ends, thereby forming a welded joint and upsetting metal inwardly at the joint thus produced, and thereafter, while such upset metal is at a kindling temperature, combusting said upset metal and aligning member by means of a selected volume of a metal-combusting gas directed to flow into contact with said upset metal.

4. In a butt-welding process wherein two tubular members of weldable metal are aligned and welded by forcing together margins thereof under pressure while heating the members at and adjacent the abutting margins to a welding temperature not substantially higher than the solidus temperature of the metal, thereby upsetting metal at the joint thus produced, the steps which include introducing a snugly-fitting aligning and gas-conducting member of combustible material within the respective members at the margins to be abutted prior to the welding operation, and immediately prior to the completion of the welding operation, while the upset metal within the tubular members at the joint is at a kindling temperature, combusting said aligning member and said upset metal within said members by means of a stream of selected volume of a metal-combusting gas directed upon said upset metal and said aligning member, and thereafter discontinuing the welding heat and the flow of metal-combusting gas.

5. Process of welding tubular members of weldable metal, which comprises aligning said members with an end of each in abutting relation, and with the opposite ends of a gas-pervious aligning member of combustible material snugly fitting within said tubular members at and adjacent the abutting ends, forcing said ends together under pressure while directing thereupon a plurality of welding flames encircling said members, thereby heating said abutting ends to a welding temperature and upsetting metal to form an internal ridge thereof at the joint thus produced, and thereafter, while such upset metal is at a kindling temperature but before completion of the welding operation, flowing a selected volume of a metal-combusting gas into contact with said aligning member and with said ridge of upset metal, thereby progressively combusting each thereof, and discontinuing the welding flames and the flow of metal-combusting gas when the tubular members have been shortened a selected amount under action of the welding heat.

6. Welding apparatus which comprises means for supporting two tubular metal members with an end of each in abutting relation; means for forcing the abutted members together under pressure; means for heating the members at and adjacent the abutting margins to a welding temperature while under pressure and for forming an internal annular ridge of upset metal at and adjacent said abutting margins; means for flowing a selected volume of a metal-combusting gas through said tubular members across said abutting margins and into contact with a gas-conducting combustible member disposed within said tubular members at and adjacent such abutting margins; means for directing the flowing metal-combusting gas into contact with the internal annular ridge of upset metal; means for initiating the flow of said metal-combusting gas upon a selected shortening of the tubular members under the action of heat and pressure; and means for discontinuing the flow of heat from said heating means upon an additional selected shortening of said members.

7. Welding apparatus which comprises means for supporting two tubular metal members with a surface of each in abutting relation; means for forcing the abutting surfaces together under pressure; means for heating the members at and adjacent the abutting surfaces to a welding temperature and for forming an internal annular ridges of upset metal at and adjacent said abutting surfaces; means for flowing a selected volume of a metal-combusting gas into contact with the internal annular ridge of upset metal and into contact with a gas-conducting combustible member disposed within said tubular members at and adjacent said abutting surfaces; automatic means operative upon a selected shortening of the metal members under the action of heat and pressure for initiating the flow of said metal-combusting gas; automatic means operative upon an additional selected shortening of the members for discontinuing the flow of heat from said heating means; and means for conducting combustion gases from the interior of said tubular members.

8. Process for welding tubular members of weldable metal, which comprises aligning two tubular metal members with an end of each in abutting relation, with an aligning member of combustible material disposed within the respective members adjacent the margins thus abutted, said aligning member providing at least one longitudinal gas passage extending between said tubular members, forcing the abutted margins together under pressure, heating the members at and adjacent the abutted margins while under pressure to a welding temperature substantially below the liquidus temperature of the metal, thereby forming an annular ridge of upset metal within said members at and adjacent said abutted margins, flowing a selected volume of a metal-combusting gas through said tubular members and into contact with said upset metal and said aligning member while said upset metal and aligning member are at their kindling temperatures, thereby consuming the same, initiating the flow of said metal-combusting gas upon a selected shortening of the tubular members under the action of heat and pressure, and discontinuing the heating of said members upon an additional selected shortening of said members.

9. Process for welding hollow members of weldable metal, which comprises aligning two tubular metal members with a margin of each in abutting relation, and with a combustible aligning member extending within each of said abutting margins, said aligning member having at least one groove in its external surface conducting oxygen and combustion gases past said abutting margins, forcing the abutted members together under pressure, heating the members at and adjacent the abutting margins to a welding temperature substantially below the liquidus temperature of the metal, thereby forcing upset metal laterally at and adjacent said margins and forming an internal ridge of upset metal, flowing a selected volume of a metal-combusting gas through said tubular members and directing it into contact with said upset metal and with said aligning member while said upset metal and aligning member are at their kindling temperatures, thereby consuming the same, initiating the flow of said metal-combusting gas upon a selected shortening of the tubular members under the action of heat and pressure, and discontinuing the heating of said members upon an additional selected shortening of said members.

10. Welding apparatus which comprises means for supporting two tubular metal members with a margin of each in abutting relation, means comprising a conduit for a cooling fluid extending within the said members and across the abutting margins of the latter, and adapted to support a replaceable tubular aligning member of combustible material contacting said conduit and portions of the tubular members at and adjacent said abutting margins; means for forcing the abutting margins together under high pressure; means for heating the tubular members adjacent the abutting margins to a welding temperature while under pressure, thereby forming an internal annular ridge of upset metal at and adjacent such margins; means for flowing a selected volume of a metal-combusting gas into contact with the aligning member and the internal annular ridge of upset metal; means for initiating the flow of said metal-combusting gas upon a selected shortening of the tubular metal members under the action of heat and pressure; and means for discontinuing the flow of heat from said heating means upon an additional selected shortening of said members.

11. Process of welding which comprises placing two tubular members of weldable metal in aligned abutting relation, with a gas-conducting aligning member of combustible material having a portion thereof snugly fitting within each of the respective members at and adjacent the abutting margins, forcing the members together under a selected pressure while heating the members at and adjacent the abutting margins to a welding temperature below the liquidus temperature of the metal, thereby forming an internal ridge of upset metal at and adjacent said abutting margins, prior to the completion of the welding operation flowing a metal-combusting gas into contact with the internal ridge of upset metal and with the combustible aligning member while such metal and aligning member are at the kindling temperature with respect to said metal-combusting gas, said gas being employed in amount sufficient to combust and consume said combustible aligning element and said ridge of upset metal, and discontinuing the welding heat and the flow of metal-combusting gas after the ridge of upset metal has been substantially consumed.

EGON B. SCHERL.

REFERENCES CITED

The following references are of record in the file of this patent:

UNITED STATES PATENTS

| Number | Name | Date |
|---|---|---|
| 2,047,306 | Brookins et al. | July 14, 1936 |
| 2,054,375 | Halle | Sept. 15, 1936 |
| 2,040,240 | Coberly et al. | May 12, 1936 |
| 2,282,508 | Anderson | May 12, 1942 |
| 2,352,306 | Anderson | June 27, 1944 |
| 2,231,014 | Lytle et al. | Feb. 11, 1941 |
| 2,350,716 | Bissout et al. | June 6, 1944 |
| 2,356,854 | Kirk | Aug. 29, 1944 |
| 2,320,700 | Kent et al. | June 1, 1943 |